United States Patent Office 3,215,690
Patented Nov. 2, 1965

3,215,690
PROCESS FOR THE PRODUCTION OF DERIVATIVES OF OXAZOLIDONES AND OXAZINONES
Ralph G. Haber, 42 Kaplansky St., Givatayim, Israel
No Drawing. Filed Apr. 23, 1963, Ser. No. 274,932
9 Claims. (Cl. 260—240)

It is an object of the present invention to provide a novel process for the production of certain derivatives of 3-amino-2-oxazolidones and of 3-amino-3,4,5,6-tetrahydro-oxazinones.

The novel process is characterized by its simplicity. The starting materials are readily available and comparatively high yields are obtained.

Various processes are known for the preparation of such compounds. Amongst others there may be mentioned the saponification of the corresponding imino-derivatives; the condensation of the corresponding hydroxy-alkyl-hydrazone with a chloroformate and the subsequent cyclisation of the intermediate compound; the reduction of the corresponding nitro-oxazolidone; condensation of an hydroxy alkyl hydrazone with an diethyl-carbonate, to yield an amino oxazolidone and the subsequent condensation of the intermediate product with a suitable ketone or aldehyde; the preparation of an hydrazone-carbonic acid hydroxy-alkyl ester, condensation with a suitable aldehyde or ketone, substitution of the hydroxy group by halogen and cyclisation.

The known processes involve either a plurality of steps, or result in relatively low yields.

According to the present invention there is provided a novel process, by means of which it is possible to effect the preparation of the desired products in one stage. This simple procedure results in most cases in comparatively high yields.

According to the present invention there is provided a process for the production of condensation products of nitrofurfural or furfural with either 3-amino-2-oxazolidone or 3-amino-3,4,5,6-tetrahydro-1,3-oxazin-2-one, which comprises the step of reacting an aldehyde-hydrazone of the general formula

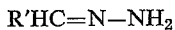

where R' is a member selected from the group consisting of nitrofuryl and furyl, with a haloalkyl haloformate of the formula

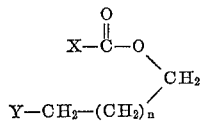

wherein X and Y are each selected from the group consisting of a chlorine and bromine and n is selected from the group consisting of 0 and 1, to yield an amino-oxazolidone or tetrahydrooxazinone of the general formula

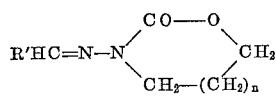

where R' and n have the above means, the reaction being effected either in an inert solvent and in the presence of a basic agent or in a sufficiently basic solvent, in the temperature range of between about 10° C. and the boiling point of the solvent, the reaction product being separated by conventional means, and if necessary—purified. According to the present invention it is possible to prepare in a very convenient manner and with good yields 5-nitro-furfurylidene-3-amino-oxazolidin-2-one, by reacting nitrofurfural-hydrazone, which is available in excellent yield with, for example, 2-chloroethyl chloroformate, which can be easily prepared from phosgene and a suitable epoxide or chlorohydrin.

The process according to the present invention is effected in an inert solvent (under the conditions of the reaction), such as for example water, alcohols, ketones, e.g., acetone or methyl-ethyl-ketone ethers, pyridine, dialkyl-carbonamides and dialkyl-sulfoxide. Whenever an inert solvent is used, there must be added to the reaction mixture a basic agent, adapted to neutralize the hydrogen chloride formed during the reaction. Amongst suitable bases there may be mentioned sodium bicarbonate, potassium carbonate and aliphatic tertiary amines such as triethylamine and methyl-morpholine. The use of caustic soda or other similar strong alkalies is not recommend, as same tend sometimes to result in inferior reaction products. The base must be of adequate strength so as to facilitate the reaction and as to prevent the formation of the corresponding azine, which would be formed from the hydrazone in acid solution. Suitable ion exchange resins may also be used.

The preferred haloalkyl-haloformates are the chloro-derivatives, which are cheaper and more readily available than the corresponding bromo-derivatives. Amongst the readily available derivatives there may be mentioned β-chloroethyl chloroformate; γ-chloropropyl chloroformate.

The process according to the present invention can be carried out at ambient temperature, but the time required is quite substantial. According to the preferred embodiment of the invention the reactants are admixed with cooling, the reatcion mixture is left to reach ambient temperature and if necessary—the reaction mixture is heated for a short time, say about 10–20 minutes. Excessive heating is to be avoided, especially whenever a strongly basic medium is used.

Other objects and a fuller understanding of the invention may be had by referring to the following examples, which are to be construed in an illustrative, non-limiting manner.

*Example 1.—Preparation of 5-nitrofurfurylidene-3-amino oxazolidin-2-one*

A three-necked reaction vessel, equipped with a stirrer, a reflux condenser and a dropping funnel, was charged with 3.1 g. nitrofurfural hydrazone dissolved in 100 ml. acetone, and a solution of 12 g. potassium bicarbonate in 50 ml. water was added with stirring. The mixture was cooled in an ice bath and 3 g. of β-chloroethyl chloroformate were added. The cooling was stopped, the reaction mixture was left till it reached ambient temperature and maintained at this temperature for about 2 hours and then refluxed during 15 minutes. The reaction mixture was acidified, acetone was distilled off under reduced pressure and the reaction mixture was poured into water.

A yellow precipitate was formed, which was filtered off with suction, washed with dilute hydrochloric acid, water, methanol and acetone. A quantity of about 3.8 g. of the crude product, i.e. a yield of 84.5 percent respective the nitrofurfural hydrazone, M.P. 245–252° C., was obtained. Recrystallisation from dimethylformamide resulted in a product having a M.P. of 256–257°.

*Example 2.—Preparation of 5-nitrofurfurylidene-3-amino oxazolidin-2-one*

A quantity of 10 g. nitrofurfural hydrazone was dissolved in a solution comprising 200 ml. pyridine and 20 ml. thiethylamine. 7.0 ml. β-chloroethyl chloroformate were added to the solution, which was refluxed for 15 minutes and left after this for a further 15 minutes at room temperature. The reaction mixture was poured into water, and the yellow precipitate which was formed was filtered off with suction, washed with water, methanol and acetone and dried.

There was obtained a yield of 9.4 g. of furazolidone, M.P. 256–257° C., and from the filtrate another crop of about 1.85 g. was recovered, M.P. 245–251° C., i.e. an overall yield of about 77.5% respective the nitrofurfural hydrazone.

*Example 3.—Preparation of furfurylidene-3-aminooxazolid-2-one*

A quantity of 2.2 g. freshly distilled furfural hydrazone was dissolved in 20 ml. dry pyridine and the solution was cooled in an ice bath. 3 ml. triethylamine and 3 g. β-chloroethyl chloroformate were added with vigorous stirring. The reaction mixture was lift overnight at ambient temperature and after this—poured into acidulated water. A white precipitate was formed which consisted of 2.3 g. of the desired product, M.P. 169–173° C.

The corresponding process, with fractionally distilled, azine-free acetone hydrazone, resulted in the formation of the corresponding derivatives, B.P. 135–140°° C./3 mm. Hg.

The corresponding process, with benzaldehyde hydrazone, resulted in the formation of the corresponding derivative, M.P. 138–143° C.; after recrystallization M.P. 141–144° C.

*Example 4.—Preparation of nitro-furfurylidene-3-amino-3,4,5,6-tetrahydro-1,3-oxazin-2-one*

2.9 nitrofurfural hydrazone was dissolved in 80 ml. acetone and a suspension of 10 g. sodium bicarbonate in 50 ml. water was added with vigorous stirring. The mixture was cooled, 3 ml. γ-chloropropyl chloroformate were added and the mixture was left overnight. The mixture was refluxed for 10 minutes and poured into water. A yellow precipitate was obtained which was filtered off, washed with dilute hydrochloric acid, methanol and acetone. A yield of 1.8 g. of the desired product, M.P. 256–261° C., was obtained.

*Example 5*

A 60 liter Pfaudler reactor was charged with 21 liters 75% dioxane ($H_2O$) 1.5 kg. 5-nitrofurfural hydrazone and 2.25 kg. sodium bicarbonate. The mixture was stirred well and cooling water was passed through the jacket of the reactor. The mixture was cooled to 15° C. and 1.5 kg. 2-chloro-ethyl chloroformate were added during a period of 10 minutes; then the jacket was drained out and steam introduced in order to heat the reaction mixture to 70° C. Eight liters of water were added and the mixture kept at 70° for 1½ hours. A further quantity of 5 liters cold water were added, the reactor mixture cooled to about 25° and filtered. The filter cake was washed with 8 liters of water and then with 5 liters acetone. The acetone washings were collected separately.

The initial filtrate and the water washings were returned to the reactor and distilled through a small column till the temperature reached 990 C. The 22 liters recovered distillate were used as solvent for the next batch. The filter cake was dried at 80° yielding 1.98 kg. (91% yield) furazolidone of melting point 256–257°.

It is clear that the present disclosure is illustrative and not restrictive, since the scope of the invention is defined by the appended claims rather than by the description preceding them, and all the changes that fall within the metes and bounds of the claims, or of forms that are their functional equivalents, are therefore intended to be embraced by these claims.

What I claim is:

1. A process for the production of a compound having the formula

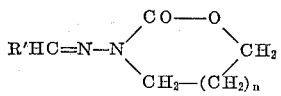

wherein R' is a member selected from the group consisting of nitrofuryl and furyl and n is selected from the group consisting of 0 and 1, which comprises condensing a hydrazone having the formula $$R'HC=N-NH_2$$

wherein R' has the above meaning, with a haloalkyl haloformate having the formula

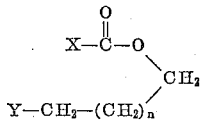

wherein X and Y are each a member selected from the group consisting of chlorine and bromine and n has the above meaning, in an inert solvent in the presence of a basic reagent selected from the group consisting of sodium bicarbonate, potassium bicarbonate, potassium carbonate, and an aliphatic tertiary amine, and maintaining the reaction mixture within the temperature range of between 10° C. and the boiling point of the solvent.

2. The process as defined in claim 1, wherein the solvent is a material selected from the group consisting of water, an alcohol, acetone, ethyl-methyl-ketone, an ether, pyridine, a dialkyl carbonamide and a dialkyl sulfoxide.

3. A process for the production of a compound having the formula

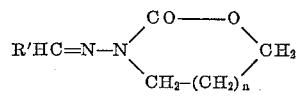

wherein R' is a member selected from the group consisting of nitrofuryl and furyl and n is selected from the group consisting of 0 and 1, which comprises condensing a hydrazone having the formula $$R'HC=N-NH_2$$

wherein R' has the above meaning, with a haloalkyl haloformate having the formula

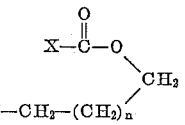

wherein X and Y are each a member selected from the group consisting of chlorine and bromine and n has the above meaning, in a basic solvent, and maintaining the reaction mixture within the temperature range of between 10° C. and the boiling point of the solvent.

4. The process as defined in claim 3, wherein the basic solvent is an aliphatic tertiary amine.

5. A process for the preparation of 5-nitrofurfurylidene-3-amino oxazolidin-2-one, which comprises reacting nitrofurfuryl hydrazone with β-chloroethyl chloroformate, in acetone and in the presence of potassium bicarbonate and maintaining the reaction mixture within a temperature range of between 10° C. and the boiling point of the solevnt.

6. A process for the preparation of 5-nitrofurfurylidene-3-amino oxazolidin-2-one, which comprises reacting nitrofurfural hydrazone with β-chloroethyl chloroformate, in a mixture of pyridine and triethylamine, and maintaining the reaction mixture within a temperature range of between 10° C. and the boiling point of the solvent.

7. A process for the preparation of 5-nitrofurfurylidene-3-amino oxazolidin-2-one, which comprises reacting nitrofurfural hydrazone with β-chloroethyl chloroformate, in a mixture of dioxane and water and in the presence of sodium bicarbonate, and maintaining the reaction mixture within a temperature range of between 10° C. and the boiling point of the solvent.

8. A process for the preparation of furfurylidene-3-amino oxazolidin-2-one, which comprises reacting furfural hydrazone with β-chloroethyl chloroformate, in a mixture of pyridine and triethylamine, and maintaining the reaction mixture within a temperature range of between 10° C. and the boiling point of the solvent.

9. A process for the preparation of nitro-furfurylidene-3-amino-3,4,5,6-tetrahydro-1,3-oxazin-2-one, which comprises reacting nitrofurfural hydrazone with γ-chloropropyl chloroformate, in acetone, in the presence of sodium bicarbonate, and maintaining the reaction mixture within the temperature range of between 10° C. and the boiling point of the solvent.

References Cited by the Examiner

UNITED STATES PATENTS 2,966,496   12/60   Arend et al. _____ 260—307

FOREIGN PATENTS 1,259,305   3/61   France.
442,413   3/25   Germany.

OTHER REFERENCES

Chemical Abstracts, volume 22, page 1759 (1928) abstract of Schotte et al., Z. Physiol. Chem., volume 174, pages 119–76 (1928).

Delaby et al.: Comptes Rendus, volume 246, pages 3353 to 3355 (1958).

WALTER A. MODANCE, *Primary Examiner.*

JOHN D. RANDOLPH, *Examiner.*